No. 840,535. PATENTED JAN. 8, 1907.
R. E. WEINLAND.
CHAIN.
APPLICATION FILED DEC. 4, 1905.

Witnesses
Vernon Plummer
T. W. McMeans

Inventor
Rutherford E. Weinland.
By Bradford & Hood
Attorneys

UNITED STATES PATENT OFFICE.

RUTHERFORD EARL WEINLAND, OF INDIANAPOLIS, INDIANA.

CHAIN.

No. 840,535.   Specification of Letters Patent.   Patented Jan. 8, 1907.

Application filed December 4, 1905. Serial No. 290,111.

*To all whom it may concern:*

Be it known that I, RUTHERFORD EARL WEINLAND, a citizen of the United States, residing at Indianapolis, in the county of Marion and State of Indiana, have invented certain new and useful Improvements in Chains, of which the following is a specification.

In the manufacture of what is known to the trade as "silent chain belts" it has heretofore been customary to produce the links from sheet-metal punchings, the wear coming upon the sheared outer ends or edges of the links. These sheared edges are necessarily somewhat rough and irregular, and as a consequence belts of this type wear very considerably during the earlier period of use.

The object of my present invention is to produce a belt of this type from bent sheet-metal links presenting the hard rolled surface or skin of the sheet as a wearing-surface.

The accompanying drawings illustrate my invention.

Figure 1:
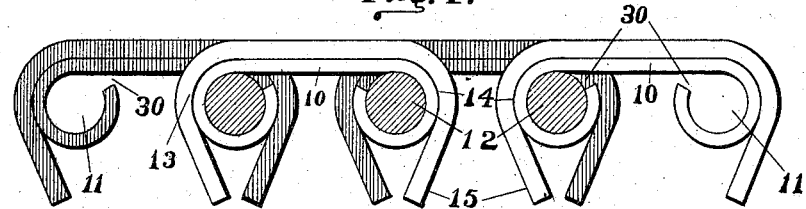
Figure 2:
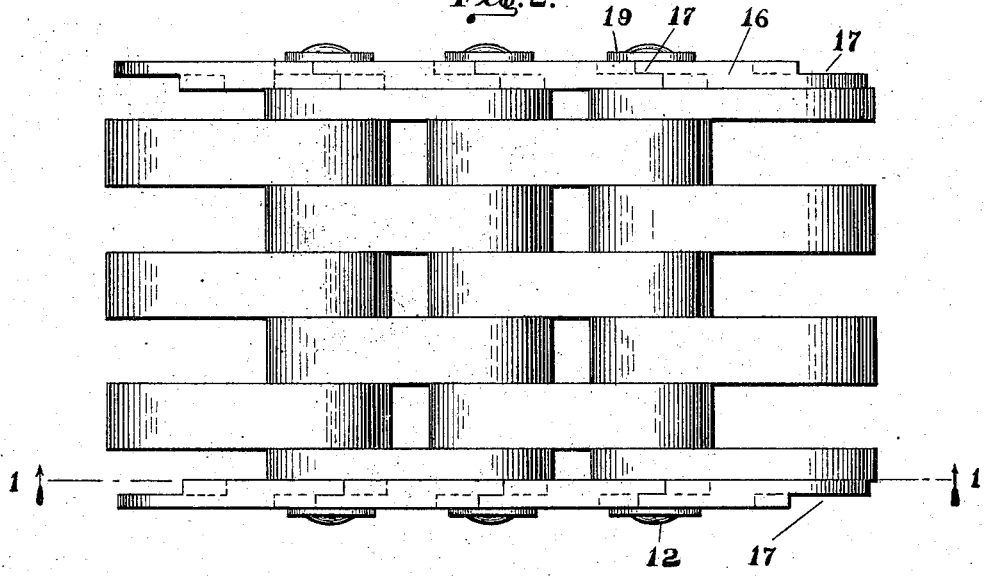
Figure 3:
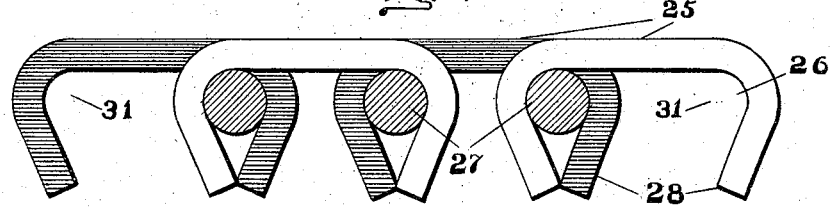
Figure 4:
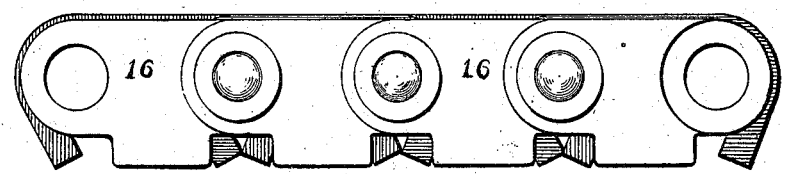

Figure 1 is a longitudinal section on line 1 1 of Fig. 2 of a belt embodying my invention; Fig. 2, a plan; Fig. 3, a section similar to Fig. 1 of a modified form, and Fig. 4 a side elevation.

In the drawings, 10 indicates a link-lining formed of a strip of sheet metal doubled upon itself at each end to form an eye 11, adapted to receive cross-pins 12. Portions 10 are to be made of tempered metal and will be protected by cap-strips 13, which are bent at each end to form sockets 14 and downward extensions 15, which form the portions of the chain to engage the teeth of the wheel over which the chain runs. The cap members 13 may be made of untempered material and are so formed that a lining member 10 may fit snugly in and between the sockets 14. The cross-pins 12 may be of any desired length, and as many links 10-13 are strung upon each pin as will be permitted by the length thereof, the links projecting alternately in opposite directions. The belt is completed by means of side links 16, which are oppositely tongued at their ends, as at 17, so as to overlap and fit upon the ends of the cross-pins 12. The various members of the belt are held together transversely by heading the ends of the cross-pins over suitable washers 19. It will be seen that by this construction the working surfaces of the links—*i. e.*, the outer surfaces of the ends 15—are the hard rolled skins of the metal sheet. This is a smooth hard surface, which immediately presents a good wearing-surface to the teeth of the wheel, and therefore not liable to quick wear or cutting.

In the form shown in Fig. 3 the lining member is omitted and the belt formed of the plurality of links 25, each of which is composed of a strip of sheet metal bent upon itself at each end to form a socket or crotch 26, adapted to embrace a cross-pin 27, and to also form extended ends 28, like the ends 15 and adapted to engage the teeth of the coöperating wheel. In this form it will be advisable to use a somewhat heavier sheet of material. The side links will be the same as in the other chain and will be the only means for holding the cross-pins in proper spacing. The inner tips of the eyes 11 should not reach the main body of the lining member. There is then left a space 30 in the form shown in Fig. 1 or a space 31 in the form shown in Fig. 3 through which a lubricant may be readily introduced to the pins 12. By this means it is possible to thoroughly lubricate all portions of all of the cross-pins.

I claim as my invention—

1. A belt composed of a multiplicity of links each formed of material bent at each end to form a pin-embracing socket and an extending working tip, and a multiplicity of transverse pins embraced in said sockets, each working tip presenting an outward working face substantially parallel with the axis of the adjacent pin, the working faces of the tips of the links embracing a given pin lying upon opposite sides of the axis thereof.

2. A belt composed of a multiplicity of links each formed of material bent at each end to form an incomplete pin-embracing socket and an extending working tip, and a multiplicity of transverse pins embraced in said sockets, each working tip presenting an outward working face substantially parallel with the axis of the adjacent pin, the working faces of the tips of the links embracing a given pin lying upon opposite sides of the axis thereof.

3. A belt composed of a multiplicity of links each consisting of an internal member formed of a strip of material bent at each end to form a pin-receiving eye, and a second cap-piece formed of a strip of material bent at each end to receive the lining-piece transversely in the plane of the eyes, and to form extended wearing-tips.

4. A belt composed of a multiplicity of links each consisting of an internal member formed of a strip of material bent at each end to form an incomplete pin-receiving eye, and a second cap-piece formed of a strip of material bent at each end to receive the lining-piece transversely in the plane of the eyes, and to form extended wearing-tips.

5. A belt composed of a multiplicity of links each formed of material bent at each end to form a pin-embracing socket and an extending working tip, a multiplicity of pins passing transversely through said sockets, spacing-links pivoted upon said pins, and means for holding the links in transverse position on the pins.

6. A belt composed of a multiplicity of links each formed of material bent at each end to form an incomplete pin-embracing socket and an extending working tip, a multiplicity of pins passing transversely through said sockets, spacing-links pivoted upon said pins, and means for holding the links in transverse position on the pins.

7. A belt composed of a multiplicity of links each consisting of an internal member formed of a strip of material bent at each end to form a pin-receiving eye, and a cap-piece formed of a strip of material bent at each end to embrace the internal member and to form extended wearing-tips, a multiplicity of pins passing transversely through said eyes, spacing-links pivoted upon said pins, and means for holding the links in transverse position on the pins.

8. A belt composed of a multiplicity of links each consisting of an internal member formed of a strip of material bent at each end to form an incomplete pin-receiving eye, and a cap-piece formed of a strip of material bent at each end to embrace the internal member and to form extended wearing-tips, a multiplicity of pins passing transversely through said eyes, spacing-links pivoted upon said pins, and means for holding the links in transverse position on the pins.

In witness whereof I have hereunto set my hand and seal, at Indianapolis, Indiana, this 25th day of November, A. D. 1905.

RUTHERFORD EARL WEINLAND. [L. S.]

Witnesses:
ARTHUR M. HOOD,
JAMES A. WALSH.